United States Patent [19]

Frantz et al.

[11] Patent Number: 4,651,859

[45] Date of Patent: Mar. 24, 1987

[54] CLUTCH DRIVEN PLATE ASSEMBLY WITH A TWO-PART HUB

[75] Inventors: Robert A. Frantz, Troy; Thaddeus Lech, Jr., Sterling Heights, both of Mich.

[73] Assignee: Borg-Warner Automotive, Inc., Troy, Mich.

[21] Appl. No.: 754,039

[22] Filed: Jul. 11, 1985

[51] Int. Cl.$^4$ .............................................. F16D 3/66
[52] U.S. Cl. ............................. 192/106.2; 192/106.1; 464/64; 464/68
[58] Field of Search ............... 192/106.1, 106.2, 70.17; 464/64, 66, 67, 68

[56] References Cited

U.S. PATENT DOCUMENTS

| | | | |
|---|---|---|---|
| 2,276,416 | 3/1942 | Nutt | 192/106.2 |
| 2,613,515 | 10/1952 | Crutchley | 192/106.2 X |
| 3,066,780 | 12/1962 | Blau | 192/70.16 |
| 3,181,673 | 5/1965 | Poliseo | 192/103 |
| 3,299,671 | 1/1967 | DeCastelet | 464/68 |
| 3,362,194 | 1/1968 | Bertelson et al. | 192/106.2 |
| 3,556,273 | 1/1971 | Maucher | 192/106.2 |
| 3,809,198 | 5/1974 | Mori | 192/106.2 |
| 4,270,645 | 6/1981 | Beccaris | 192/106.1 |
| 4,285,423 | 8/1981 | Fadler et al. | 192/106.2 |
| 4,398,625 | 8/1983 | Beccaris | 464/68 X |
| 4,418,812 | 12/1983 | Lech, Jr. | 192/106.2 |
| 4,433,770 | 2/1984 | Loizeau et al. | 192/106.2 |
| 4,446,955 | 5/1984 | Lech, Jr. | 192/106.2 |
| 4,545,473 | 10/1985 | Alas | 192/70.12 X |
| 4,549,641 | 10/1985 | Ootani et al. | 192/106.1 X |
| 4,556,136 | 6/1985 | Lech, Jr. | 192/106.2 |
| 4,564,097 | 1/1986 | Kabayama | 192/106.2 X |

FOREIGN PATENT DOCUMENTS

| | | | |
|---|---|---|---|
| 1285339 | 12/1968 | Fed. Rep. of Germany | 192/106.1 |
| 2503295 | 10/1982 | France | 192/106.2 |
| 968623 | 9/1964 | United Kingdom | 192/106.1 |

*Primary Examiner*—Rodney H. Bonck
*Attorney, Agent, or Firm*—James A. Geppert

[57] ABSTRACT

A clutch driven plate assembly for use in an automotive vehicle adapted to dissipate the irregular impulses of the vehicle engine with the transmission in neutral, the clutch engaged and the engine at idle rpm. The assembly comprises a clutch plate, a spring retainer plate secured to the clutch plate, and a hub assembly in operative engagement with the transmission input shaft and including an inner hub, an outer hub having spring windows therein, and a meshing backlash spline connection between said hubs allowing limited relative rotation therebetween; the clutch plate and spring retainer plate having spring windows axially aligned and substantially coinciding with said outer hub spring windows to receive damper springs therein. An axially movable inner cam has a splined opening receiving the splined transmission shaft and projections with 45° camming surfaces, an outer cam has cooperating camming surfaces and lugs projecting into notches in the hub spring windows, and cam springs positioned in aligned recesses in the inner cam and inner hub to align the splines of the inner cam and inner hub and yieldably bias the parts axially apart.

11 Claims, 17 Drawing Figures

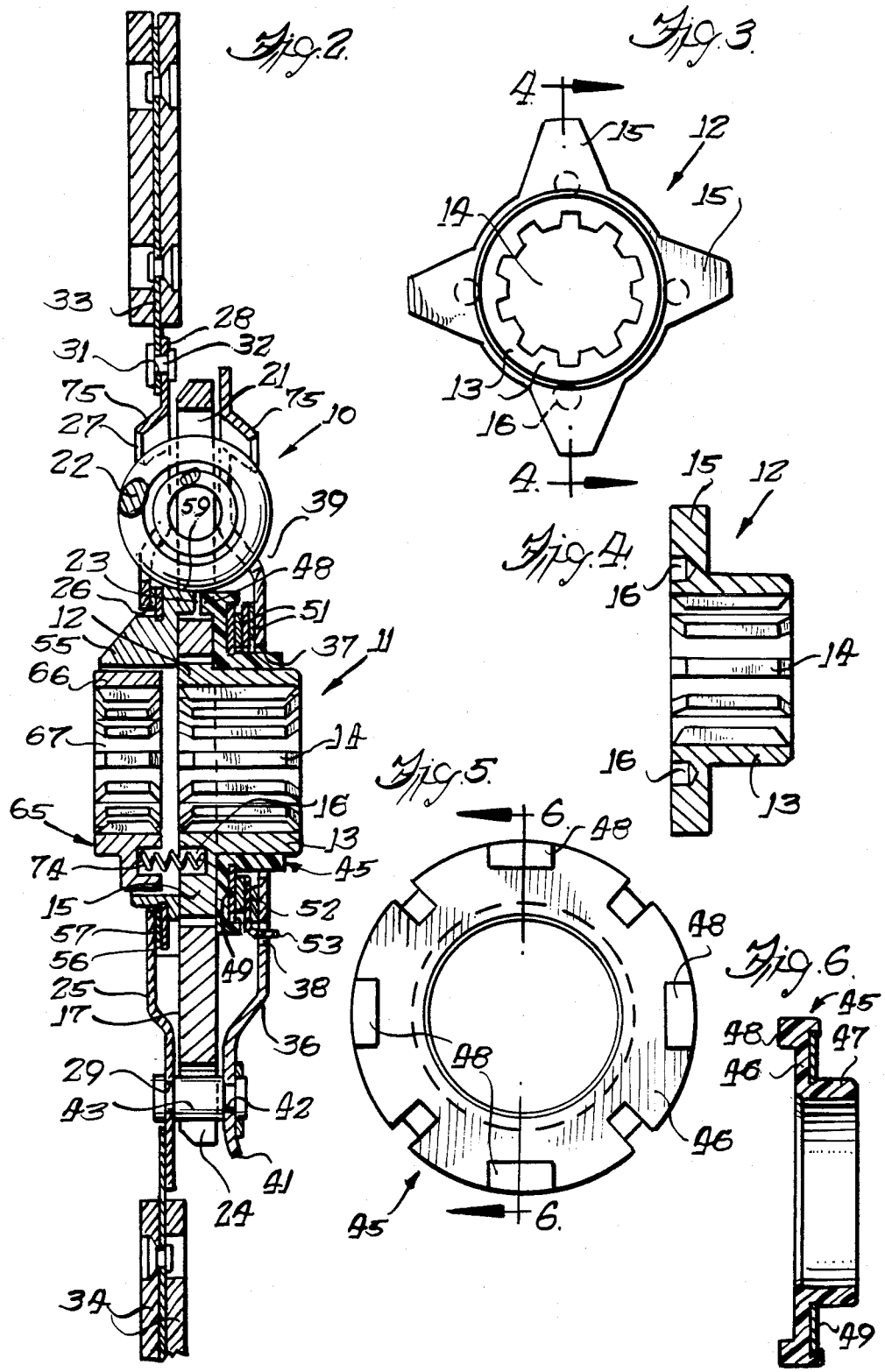

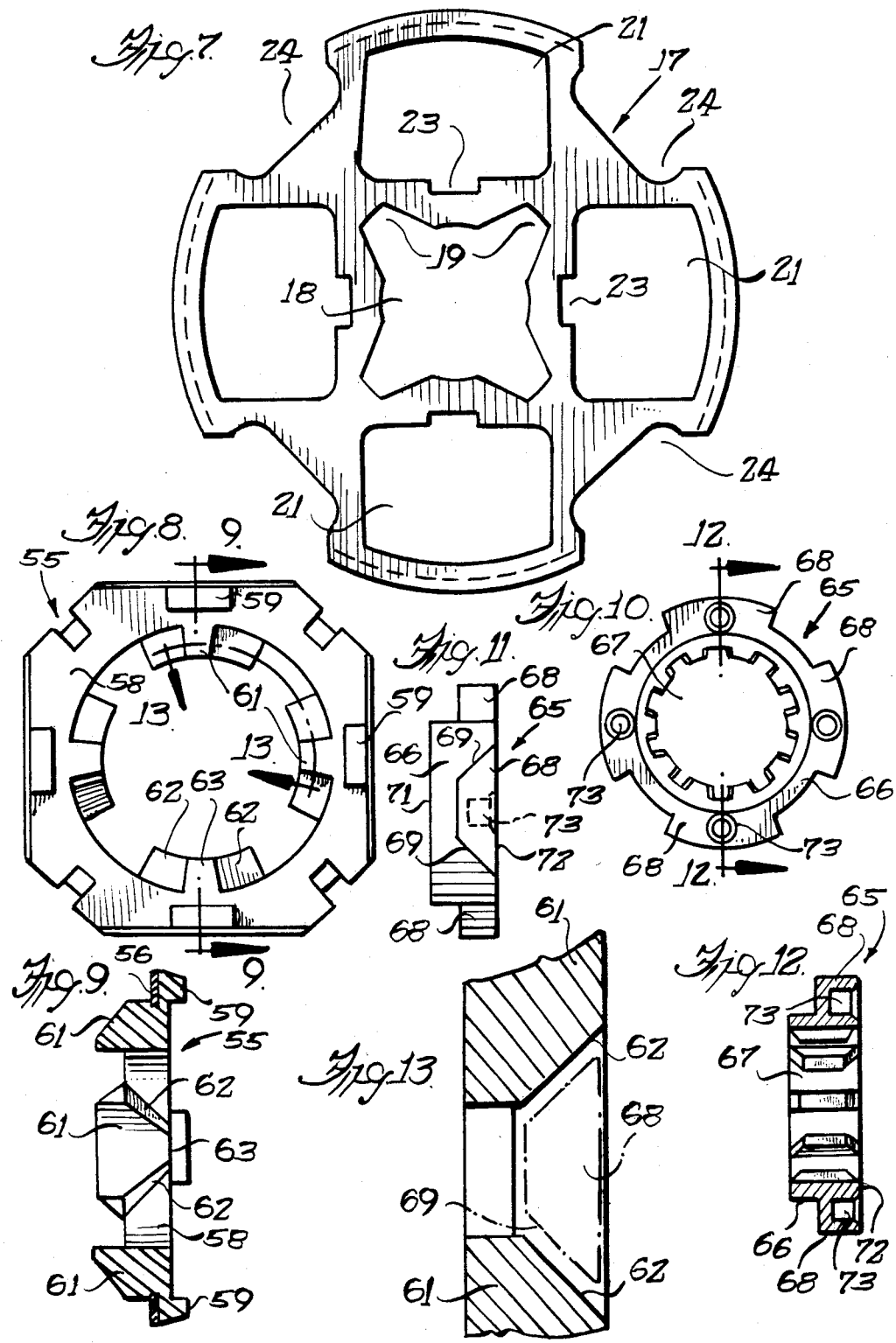

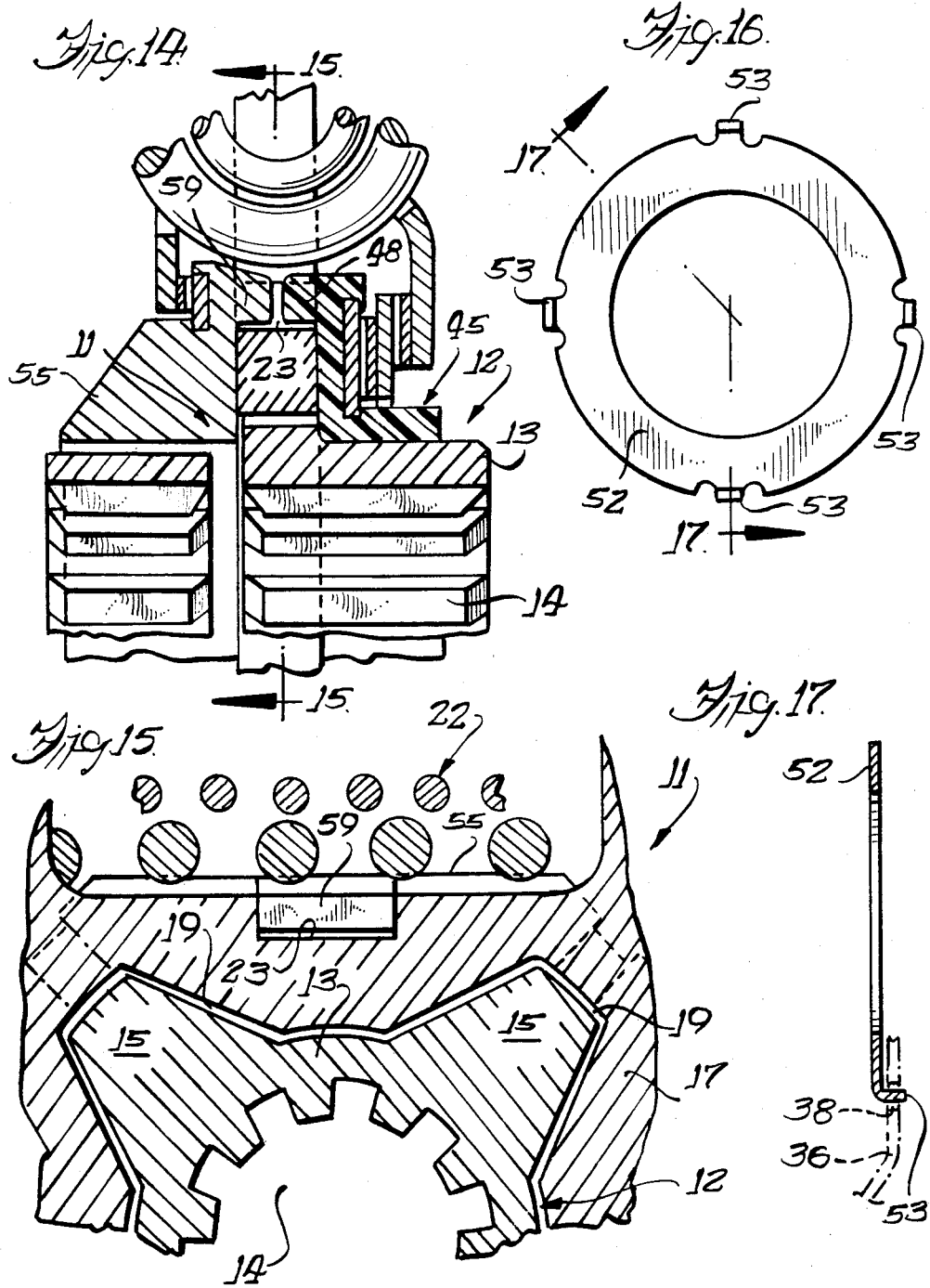

1

CLUTCH DRIVEN PLATE ASSEMBLY WITH A TWO-PART HUB

BACKGROUND OF THE INVENTION

In a conventional friction clutch for a manual transmission in an automotive vehicle, the vehicle engine produces power and inertia impulses which will drive the engaged clutch with an irregular series of thrusts with the transmission in neutral and the engine at idle rpm. These impulses are transmitted through the clutch and transmission input shaft to the transmission gears which becomes excited, resulting in oscillation through their backlash space to produce objectionable rattle. In U.S. Pat. No. 4,446,955, a driven plate assembly is disclosed utilizing a helical connection between an inner hub and an outer hub to allow relative axial movement between the hubs to dissipate the engine impulses. Also, in copending application Ser. No. 556,517, now U.S. Pat. No. 4,556,136, a cam and ramp arrangement is shown for translation of rotary to axial motion to overcome the engine impulses. The present invention relates to an improved approach to this problem providing simplification of the clutch structure.

SUMMARY OF THE INVENTION

The present invention comprehends the provision of a clutch driven plate assembly having a novel hub assembly and cooperating cam arrangement to dissipate engine impulses which previously resulted in objectionable transmission gear rattle with the clutch engaged, the transmission in neutral and the engine at idle rpm. The hub assembly includes an inner hub having a barrel in operative engagement with the transmission input shaft and an integral radial flange with external backlash splines formed thereon and an outer hub having a flange with damper spring windows formed therein and internal meshing backlash splines. An inner cam has a splined internal diameter and 45° camming surfaces or ramps interengaging complementary ramps on an outer cam provided with anti-rotation lugs engaging notches formed in the outer hub for simultaneous rotation thereof, and resilient means acting between the inner cam and the inner hub. The interengaging camming surfaces provide for axial movement of the inner cam relative to the outer cam and hub against the force of the resilient means.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is an enlarged cross sectional view of the clutch assembly taken on the irregular line 2—2 of FIG. 1.

FIG. 3 is a rear elevational view of the inner hub for the hub assembly.

FIG. 4 is a vertical cross sectional view of the inner hub taken on line 4—4 of FIG. 3.

FIG. 5 is an enlarged rear elevational view of a spacer in the clutch assembly.

FIG. 6 is a vertical cross sectional view of the spacer taken on line 6—6 of FIG. 5.

FIG. 7 is a rear elevational view of the outer hub of FIGS. 1 and 2.

FIG. 8 is a rear elevational view of an outer cam.

FIG. 9 is a vertical cross sectional view taken on line 9—9 of FIG. 8.

FIG. 10 is a rear elevational view of an inner cam.

FIG. 11 is a side elevational view of the inner cam.

FIG. 12 is a vertical cross sectional view taken on line 12—12 of FIG. 10.

FIG. 13 is an enlarged partial cross sectional view taken on the arcuate line 13—13 of FIG. 8.

FIG. 4 is an enlarged partial cross sectional view of the hub and cam arrangement shown in FIG. 2.

FIG. 15 is an enlarged partial cross sectional view taken on line 15—15 of FIG. 14.

FIG. 16 is a rear elevational view of a thrust plate for the clutch assembly.

FIG. 17 is a cross sectional view taken on the irregular line 17—17 of FIG. 16.

DESCRIPTION OF THE PREFERRED EMBODIMENT

Figure 1:
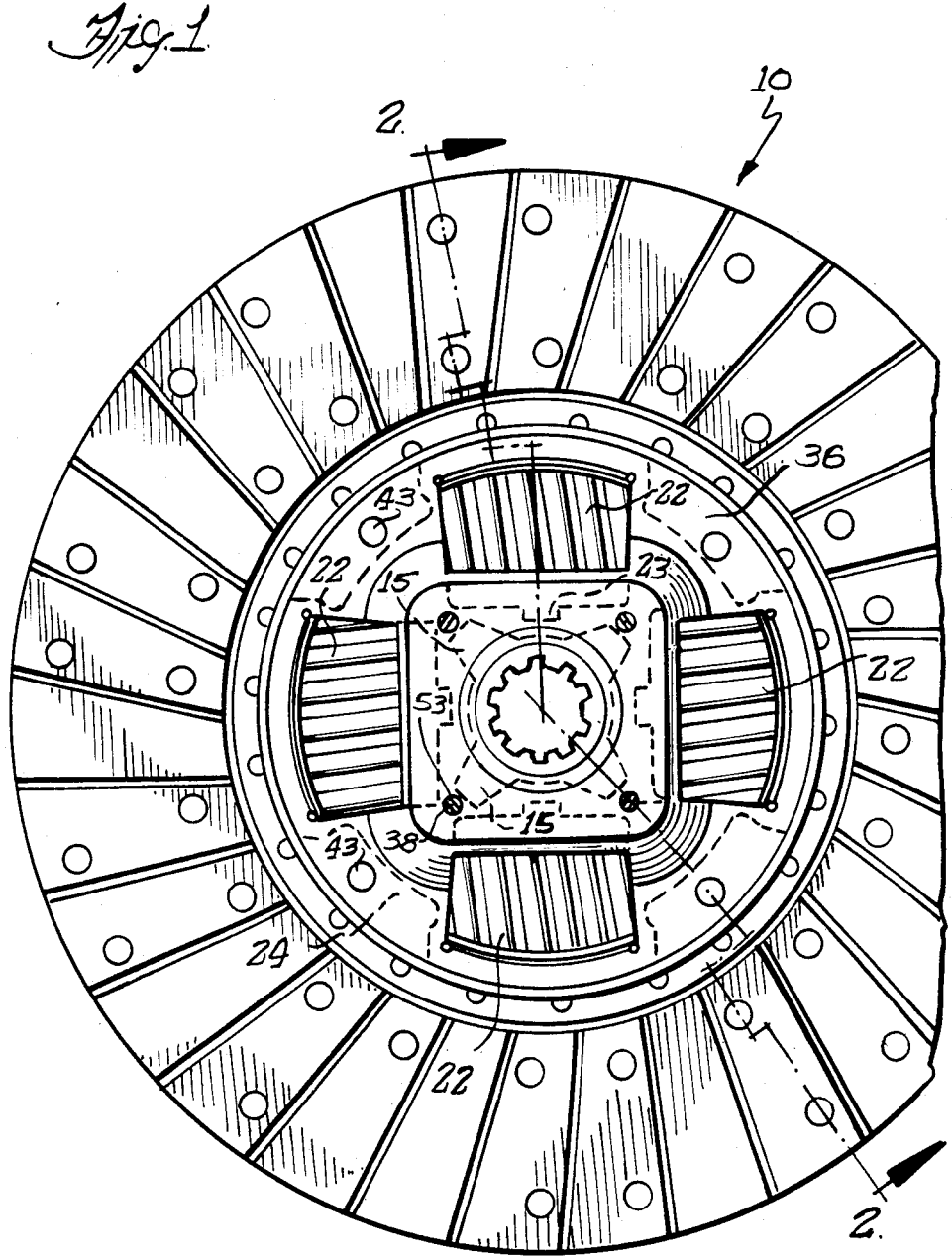
FIG. 1 is a rear elevational view of a clutch driven plate assembly with a portion broken away embodying the present invention.

Referring more particularly to the disclosure in the drawings wherein is shown an illustrative embodiment of the present invention, FIGS. 1 and 2 disclose a clutch driven plate assembly 10 including a hub assembly 11, a clutch plate 25 carrying friction facings 34 mounted on the periphery thereof and adapted to be positioned between friction surfaces of a flywheel and a pressure plate (not shown) for the vehicle clutch, and a spring retainer plate 36. The hub assembly 11 (FIGS. 2, 3, 4 and 7) includes an inner hub 12 having a barrel 13 with a splined central opening 14 receiving the splined end of a transmission input shaft (not shown) and integral radially extending equally spaced tapered splines 15; each spline containing a forwardly opening spring recess 16. An outer hub 17 has a central opening 18 which has recesses 19 generally complementary to but larger than the splines 15 (see FIG. 15) of the inner hub for a purpose to be later described. The outer hub 17 is a generally flat plate with circumferentially equally spaced openings 21 for damper springs 22, each opening having a central notch 23 (FIG. 7). Also, the periphery of the outer hub is provided with elongated notches 24.

The clutch driven plate 25 has a central opening 26, a plurality of circumferentially equally spaced spring windows 27, and an inwardly offset outer periphery 28 containing a plurality of openings 29 and 31 arranged on two circles; the openings 31 receiving rivets 32 to secure cushioning plates 33 thereto carrying the opposed friction facings 34 for the clutch.

The spring retainer plate 36 has a central opening 37 with four circumferentially equally spaced openings 38 therein adjacent the central opening, a plurality of circumferentially equally spaced arcuate spring windows 39 axially aligned with and of substantially the same dimensions as the windows 21 and 27 of the outer hub and clutch plate, respectively, and a plurality of openings 42 in the inwardly offset periphery 41 axially aligned with openings 29 to receive spacer rivets 43. The rivets 43 extend through the elongated notches 24 in the outer hub periphery to secure the clutch plate 25 and spring retainer plate 36 together.

Positioned on the hub barrel 13 is a spacer or bearing 45 (FIGS. 5 and 6) having a radial flange 46 and integral axial sleeve 47. Four axially forwardly extending lugs 48 are formed on the periphery of flange 46 to be partially received in the notches 23 in the outer hub 17 to rotate therewith, so that the inner hub 12 is piloted concentric to the outer hub. The spacer is formed of a suitable plastic material with, as seen in FIG. 6, a friction washer 49 molded in place to provide a friction surface for shims 51 located between the spacer flange 46, thrust plate 52 (FIGS. 16 and 17) and spring retainer plate 36. The thrust plate 52 is a generally annular flat plate with rearwardly extending ears 53 projecting into the openings 38 of the spring retainer plate.

An outer cam 55, positioned on the opposite side of the hub assembly from the spacer 45, is located between the clutch 25 and the outer hub 17 and has a friction washer 56 molded in place to cooperate with shims 57. The outer cam (FIGS. 8 and 9) includes a generally rectangular body 58 with rearwardly extending integral lugs 59 partially extending into the notches 23 in the outer hub and four circumferentially equally spaced forwardly and inwardly extending projections 61 having oppositely disposed 45° ramps 62 thereon; the ramps diverging from rear edges 63.

Located concentrically within the outer cam 55 is an axially reciprocable inner cam 65 (FIGS. 10 through 12) including a cylindrical body of barrel 66 having a central splined opening 67 receiving the splined end of the transmission input shaft. Extending radially outwardly from the barrel 66 are four circumferentially equally spaced projections 68 having oppositely disposed 45° inclined ramps or camming surfaces 69,69 with the projections being complementarily received between the projections 61 on the outer cam 55; the ramp surfaces 69,69 converging toward the front 71 of the cam. In the rear surface 72 of each cam projection 68 is a spring recess 73 adapted to be axially aligned with the recesses 16 in the inner hub 12 to receive the ends of relatively light compression springs 74. These springs serve the dual function of normally biasing the inner hub and inner cam apart, limited by the coacting projections 61,68 and of aligning the splines in the central openings 14 and 67 of the inner hub 12 and inner cam barrel 66, respectively.

One or more concentric damper springs 22 are located in each aligned set of spring windows 27,38 and 21 in the plates and outer hub, with the plate windows 27 and 38 having inclined outer lips 75 to retain the springs in operative position. The spring windows 21 in the outer hub 17 and the windows 27 and 38 in the clutch and spring retainer plates have identical circumferential dimensions so that the plates, damper springs and outer hub can all rotate simultaneously. Also, the springs 74 are 90° out of plane with the normal damper springs 22 to break up harmonic influence and resonance by changing the plane of motion.

In the disengaged position of the clutch, the spacer bushing 45 acts to pilot the inner hub 12 central to the outer hub 17, the thrust plate 52 is keyed to the spring retainer plate 36 through the ears 53 received in openings 38, and the damper springs 22 are positioned in the spring windows of the plate and outer hub in an uncompressed state. Also, the springs 74 urge the inner cam 65 forwardly away from the inner hub 12 with the ramps 62 and 69 being fully engaged as seen in FIG. 13. This clutch assembly operates in the same manner as a conventional assembly except for the action of the inner cam 65 and outer cam 55 with the clutch engaged at idle rpm and the transmission in neutral position. With the clutch engaged between the flywheel and pressure plate, the engine impulses during idle act to rotate the clutch plate 25, spring retainer plate 36, outer hub 17 and damper springs 22 relative to the inner hub 12 due to the backlash space between the splines 15 on the inner hub and recesses 19 in the outer hub (see FIG. 15). As the lugs 59 of the outer cam 55 are conformably received in the notches 23 of the outer hub, the outer cam rotates with the outer hub and causes the inner cam to move axially rearwardly towards the inner hub on the input shaft against the force of compression springs 74 due to the interaction of the ramp surfaces 62,69. Movement continues until the splines 15 engage the sides of recesses 19 and compression of the damper springs 22 is initiated. Thus, the energy of the impulses is used to actuate the inner cam in the above manner rather than transmit the undiminished impulses to the vehicle transmission to cause its gears to rattle.

In the normal driving mode of the vehicle, the outer hub 17 engages the inner hub 12 and the damper springs 22 are compressed upon torque application to the friction facings. The friction washers 49 and 56 on the spacer 45 and outer cam 55, respectively, act with the shims to provide friction lag for the normal damper operation in the conventional manner.

We claim:

1. A clutch driven plate assembly for an automotive vehicle clutch driving a transmission input shaft, comprising a hub assembly including an inner hub with a barrel splined into the input shaft and an outer hub, a clutch plate carrying friction facings at the outer periphery thereof, a spring retainer plate secured to the clutch plate to sandwich said outer hub therebetween, said plates and outer hub having axially aligned sets of circumferentially spaced windows therein, and damper springs received in each set of windows, the improvement comprising meshing backlash splines between said inner and outer hubs allowing limited relative rotation therebetween, an outer cam located generally between said clutch plate and outer hub and operatively connected to said outer hub, said outer cam having inner projections with a series of camming surfaces thereon, an inner cam within said outer cam and splined onto said transmission input shaft, said inner cam having outer projections with complementary camming surfaces thereon engaging the camming surfaces on said outer cam, peripheral lugs on said outer cam, said outer hub spring windows including notches closely receiving said lugs to provide simultaneous rotation thereof, said inner cam having circumferentially spaced recesses facing said inner hub and said inner hub having recesses axially aligned with said inner cam recesses, and a compression spring received in each aligned pair of facing recesses to bias the inner cam away from the inner hub, whereby rotation of said plates, damper springs and outer hub causes rotation of said outer cam and said interengaging camming surfaces causes axial movement of said inner cam.

2. A clutch driven plate assembly as set forth in claim 1, in which said camming surfaces are 45° inclined surfaces.

3. A clutch driven plate assembly as set forth in claim 1, including a thrust plate between said outer hub and spring retainer plate having circumferentially spaced ears thereon, said spring retainer plate having openings receiving said ears.

4. A clutch driven plate assembly as set forth in claim 3, including friction shims between said outer hub, spring retainer plate and said thrust plate.

5. A clutch driven plate assembly as set forth in claim 1, in which said meshing backlash spline connection includes a plurality of circumferentially spaced tapered splines on said inner hub, and said outer hub has a central opening conformably receiving said inner hub and having complementary tapered recesses larger than and receiving said tapered splines to allow limited relative rotation between said hubs.

6. A clutch driven plate assembly as set forth in claim 1, wherein the circumferential dimensions of the spring windows in the clutch plate, outer hub and spring retainer plate are substantially equal.

7. A clutch driven plate assembly for an automotive vehicle clutch driving a transmission input shaft, comprising a hub assembly including an inner hub with a barrel splined onto the input shaft and an outer hub, a clutch plate carrying friction facings at the outer periphery thereof, a spring retainer plate secured to the clutch plate to sandwich said outer hub therebetween, said plates and outer hub having axially aligned sets of circumferentially spaced windows therein, and damper springs received in each set of windows, the improvement comprising meshing backlash splines between said inner and outer hubs allowing limited relative rotation therebetween, an outer cam located generally between said clutch plate and outer hub and having peripheral lugs, said outer hub spring windows including notches closely receiving said lugs to provide simultaneous rotation thereof, an annular spacer positioned between said outer hub and spring retainer plate, said spacer having spaced peripheral lugs axially aligned with and facing said lugs on said outer cam and received in said notches, a series of camming surfaces on said outer cam, an inner can within said outer cam and splined onto said transmission input shaft, said inner cam having complementary camming surfaces engaging the camming surfaces on said outer cam, whereby rotation of said plates, damper springs and outer hub causes rotation of said outer cam and said interengaging camming surfaces causes axial movement of said inner cam.

8. A clutch driven plate assembly as set forth in claim 8, wherein said spacer and said outer cam each includes a friction washer molded therein, and shims between the friction washers and either said clutch plate or spring retainer plate.

9. A clutch driven plate assembly as set forth in claim 7, wherein said outer cam has inner projections with said camming surfaces thereon, and said inner cam has outer projections with said camming surfaces thereon.

10. A clutch driven plate assembly as set forth in claim 9, wherein said camming surfaces are 45° inclined surfaces, said inner cam having circumferentially spaced recesses facing said inner hub and said inner hub has recesses axially aligned with said inner cam recesses, and a compression spring received in each aligned pair of facing recesses biasing the inner cam and inner hub apart.

11. A clutch driven plate assembly as set forth in claim 7, wherein said meshing backlash spline connection includes a plurality of circumferentially spaced, outwardly extending tapered splines on said inner hub, and said outer hub has a central opening conformably receiving said inner hub and having complementary tapered recesses larger than and receiving said tapered splines to allow limited relative rotation between said hubs.

* * * * *